(12) United States Patent
Kangler

(10) Patent No.: US 7,401,601 B2
(45) Date of Patent: Jul. 22, 2008

(54) HEAT EXCHANGER MODULE

(76) Inventor: Wolfram Kangler, Bachbugler Weg 9, Nittenau-Brunn (DE) 93149

( * ) Notice: Subject to any disclaimer, the term of this patent is extended or adjusted under 35 U.S.C. 154(b) by 144 days.

(21) Appl. No.: 11/249,627

(22) Filed: Oct. 14, 2005

(65) Prior Publication Data

US 2006/0081223 A1      Apr. 20, 2006

(30) Foreign Application Priority Data

Oct. 15, 2004   (DE) .................. 10 2004 050 601

(51) Int. Cl.
    *F02G 5/00*        (2006.01)
(52) U.S. Cl. ...................... 123/553; 123/557
(58) Field of Classification Search ............ 123/541, 123/553, 557, 575, 576, 577, 578
    See application file for complete search history.

(56) References Cited

U.S. PATENT DOCUMENTS 4,349,001 A * 9/1982 Wagner ................. 123/557

| | | | | |
|---|---|---|---|---|
| 4,372,278 A | * | 2/1983 | Smith ..................... | 123/557 |
| 5,832,902 A | * | 11/1998 | Davis et al. ............... | 123/514 |
| 2001/0025631 A1 | * | 10/2001 | Beekman et al. ........... | 123/557 |
| 2002/0170545 A1 | | 11/2002 | Ekstam et al. | |

FOREIGN PATENT DOCUMENTS

| | | |
|---|---|---|
| DE | 3442980 | 5/1986 |
| DE | 3800585 | 7/1988 |
| DE | 19736283 | 2/1999 |
| DE | 200 15 011 | 3/2001 |
| DE | 199 63 229 | 6/2001 |
| DE | 202 08 590 | 9/2002 |
| DE | 102 32 514 A1 | 1/2004 |
| JP | 59126059 | 7/1984 |

\* cited by examiner

*Primary Examiner*—Erick Solis
(74) *Attorney, Agent, or Firm*—Hoffman, Wasson & Gitler, PC

(57) ABSTRACT

For use in an internal combustion engine equipped with a fuel injection system, a heat exchanger module features a distributor block, which is connected via at least one first fuel line with the intake of the injection system and via at least one second fuel line with the output of the injection system. A thermal compensation takes place between the at least one fuel conveyed out of the injection system and the distributor block.

8 Claims, 1 Drawing Sheet

HEAT EXCHANGER MODULE

BACKGROUND OF THE INVENTION

The invention relates to a heat exchanger module for use in an internal combustion engine containing a fuel injection system, wherein at least one first fuel type is supplied to the fuel injection system for operation of the internal combustion engine.

The use of vegetable oils as biomass fuels offers ecological and economical advantages as compared with fossil fuels. Vegetable oils are obtained from renewable raw materials, which means that during combustion they are essentially carbon dioxide neutral, free of sulfur and, as opposed to conventional fuels, biologically degradable. Furthermore, the discharge of particles during combustion is reduced drastically in comparison with diesel.

Due to the different chemical and physical fuel properties of vegetable oils as compared with diesel fuels or bio diesel, specially developed vegetable oil engines or modified series production diesel engines must be used in order to operate standard automobiles with vegetable oil. However, such a use of natural vegetable oil as a fuel causes considerable technical difficulties especially in modern series production direct fuel injection diesel engines.

Conventional fuel injection systems of nearly all standard series production diesel engines feature for example one fuel line or supply line from a fuel tank, in particular a diesel tank, to an injection system and one return line from the injection system back to the fuel tank. During operation for example of a series production diesel engine the volume flow in the circulation from the fuel tank through the injection system and back to the fuel tank is on average a multiple of the actual quantity of fuel used by the series production diesel engine per time unit. The fuel circulating thus in the injection system serves to lubricate the mechanical parts and also transports the operating heat out of the injection system. In many fuel injection systems the returning fuel is therefore used additionally to heat a fuel pre-filter, for example.

In new types of fuel injection systems with a radial piston pump and especially in systems with the "common rail" or "pump-nozzle" or "pump-line-nozzle" technology, on the other hand, the fuel circulating in the injection system is used especially for cooling. Due to mechanical work and the configuration of the components supplying the fuel, operation of such a fuel injection system results by principle in a thermal power of several kilowatts, which is compensated by means of the fuel circulation. Before returning to the fuel tank, the heated fuel frequently passes through a heat exchanger or return condenser. Such a return condenser maintains thermal stability in the injection system. Furthermore, gas bubbles that have formed in the fuel or inadvertently admitted air are continuously removed from the injection system by means of the return line.

For the use of fuels with more favorable properties for the injection and combustion in the engine at higher fuel temperatures, it has proven useful to bypass the fuel tank—wholly or partially—during the return of the fuel to the forward flow (short-circuit return). This process is used to influence the flow properties of fuels with highly temperature-dependent viscosity and can additionally be based on the gradient of the bubble-point curve, the ignition temperature or other chemical or physical properties. DE 197 36 283 describes a fuel supply system in which a return line to the tank is provided to protect the fuel from overheating based on its viscosity.

Furthermore, methods for operating an internal combustion engine with two separately supplied fuel types, for example with diesel fuel and vegetable oil, are known, in which a diesel engine is supplied with either diesel fuel or heated vegetable oil depending on the temperature of the engine's cooling water. Such systems are referred to in the literature as 2-tank systems. DE 202 08 590, for example, describes a 2-tank system in which the fuel is heated by means of a cooling water-operated heat exchanger and an electric heating source, wherein the vegetable oil is preferably heated to 70° C. DE 38 00 585 likewise describes a temperature-dependent switching of the fuel supply for operating an internal combustion engine with two separate fuel types.

The now widespread direct fuel injection diesel engines have significantly higher operating requirements for the complete combustion of the injected fuel than is the case with pre-combustion chamber or whirl chamber diesel engines. In addition, the applicable and future emissions standards are a decisive factor in the design of new diesel engines and corresponding injection systems. Due to the current emissions standards it is necessary to keep the nitrogen oxide and soot emission levels of newly developed diesel engines as low as possible.

For this purpose, exhaust return flow systems are known in the art and are installed in a multitude of commercially available diesel vehicles. In such exhaust return flow systems a lower oxygen concentration is provided for the combustion process by mixing exhaust gas with the intake air. This avoids local peak temperatures during the combustion process, which contribute to the thermal formation of NO (Zeldovich NO). The goal of preventing nitrogen oxide is in direct conflict with the formation of soot, since the soot is not sufficiently oxidized at a low oxygen concentration.

A further measure for reducing the nitrogen oxide emissions is the controlled dynamic adjustment of the injection (at times also several injections per cycle) or of the start of supply to "retard", i.e. at a position of the piston before or after top dead center that is reached at a later point in time. The exhaust behavior can also be affected by the injection pressure. A lower injection pressure causes the formation of larger droplets, which in turn results in a higher soot content.

The technical design and the regulation of a fuel injection system are optimized for the use of regular diesel fuel in modern direction injection diesel engines. Exhaust return flow, retard, etc. are achieved for example by an electronic control during operation of the vehicle based on the current operating parameters and comparison values that are optimized for diesel operation. Now, if pure vegetable oil is used instead of diesel fuel, for example, such measures can frequently cause malfunctions or serious engine damage.

Current tests of corresponding conversion systems for the operation of series production diesel engines with vegetable oil have shown that serious problems occur especially with direct injection diesel engines, in particular with "common rail" and also "pump-nozzle" diesel engines. For example, the complete combustion of the vegetable oil is frequently not ensured under certain operating conditions, in particular during a cold start or when the diesel engine is operated under a moderate load. Such unfavorable operating conditions occur regularly and frequently especially with automobiles, commercial vehicles and agricultural machines. Possible consequences of incomplete combustion are the entry of unburned vegetable oil in the motor oil, resulting in the formation of clumps due to polymerization. This causes a breakdown in the lubrication system. In addition, changes in the injection nozzles ("coking") cause a defective injection pattern, which can result in serious damage to the piston heads, the piston rings and the valves.

Without internal modification to the engine, i.e. only with changes in the peripheral units of the engine and in the fuel supply system, such direct injection series production diesel engines cannot be converted for operation with pure vegetable oil with any appreciable degree of reliability, long-term stability and convenience, also taking into account regularly occurring unfavorable operating conditions.

Both for the cold start and the warm-up phase of such a diesel engine and during certain operating conditions, it has proven technically advantageous and desirable to supply the fuel injection system with pure diesel fuel, pure vegetable oil or a mixture of vegetable oil and diesel fuel. Even a small percentage of diesel fuel in a mixture with vegetable oil significantly reduces the viscosity of the diesel-vegetable oil mixture as compared with pure vegetable oil and generally also distinctly improves combustion in the internal combustion engine. For this purpose, a defined mixture ratio of the fuel mixture located in the fuel injection system based on the respective operating condition of the diesel engine is necessary.

Particularly during the starting process of a diesel engine it is necessary that the injected fuel be immediately ignitable and completely combustible. Especially during a cold start after being parked for an extended period and after cooling of the diesel engine accordingly, the fuel in the injection system should be replaced wholly or at least partially with diesel fuel. This process is referred to as "flushing" and preferably is also carried out before shutting off the engine, while the engine is still running. For this purpose, the diesel engine is supplied only with diesel fuel for a specified duration, which continuously increases the proportion of diesel in the fuel mixture in the injection system. Due to the design of the injection systems, flushing is essentially a dilution process and only to a small degree a displacement process. The proportion of vegetable oil in the overall quantity of fuel within the injection system during the flushing process can therefore be described in good approximation based on an exponential decay curve, which depends only on the supplied quantity of diesel fuel for a given injection system.

If the fuel or the fuel mixture is supplied as described above in a short-circuit return flow, the supplied quantity of diesel fuel corresponds exactly to the quantity of fuel injected into the combustion chambers. Knowledge of the consumption of the vehicle makes it possible to estimate the diesel concentration based on the distance traveled or the time that elapses after initiation of the flushing process. Typical distances for a "sufficient" flushing process are 5-10 km before shutting off the engine.

For the purpose of supplying diesel fuel more quickly, the flushing process can be implemented so that a return flow to the tank is ensured. Then the quantity of diesel supplied is determined not only based on consumption, but additionally by the quantity of fuel returning to the fuel tank. The latter is by far the dominating factor in this process.

A measurement of the time or distance after initiation of the flushing process does not allow for reliable information on the current mixture ratio of the fuel mixture in the injection system under otherwise non-constant external conditions.

The volume flow into the fuel tank corresponds to the volume pumped by the injection system and depends on a number of parameters. The exact determination of these parameters is not directly possible. At best, average values can be estimated over extended periods, by averaging the relevant parameters. A typical magnitude for the volume flow through a distributor injection pump during operation is for example approximately 60 liters per second. Therefore, a flushing process under suitable ambient parameters can be completed in less than one minute.

The exact determination of the percentage mixture ratio of the fuel types is not always necessary for this purpose. However, it is particularly important to be able to reliably determine a point in time for the flushing process at which a pre-determined mixture ratio has been reached during operation of the diesel engine, after the supply of fuel has been switched from one type to another. In addition, it is necessary to be able to set a selectable mixture ratio of the fuel types during operation and to be able to automatically maintain the set mixture ratio, without resulting in mixing of the fuels in the fuel tanks.

In addition, it is necessary that the temperature of the fuel in the injection system be approximately 70° Celsius. This necessitates a compromise of the achieved low viscosity on the one hand and protection of the components of the internal combustion engine on the other hand, since overheating of the components of the internal combustion engine would mean that the fit dimensions of the mechanical parts could no longer be complied with and the seals would fail.

Conventional configurations provide for a discrete heat exchanger for this purpose, which in many applications does not provide sufficiently positive results. Although the fuel supplied through the discrete heat exchanger is heated, the existing heat diminishes quickly, especially in those cases in which the heated fuel passes through several valves or a pump or other components. Vegetable oil in particular has a considerably lower heat capacity than that of water, so that this fuel cools even more quickly than diesel fuel when an internal combustion engine is operated with vegetable oil.

A further disadvantage is that vegetable oil cannot be subjected to frequent temperature fluctuations, since this results in chemical alterations of the vegetable oil. Therefore it is necessary to heat vegetable oil with care and then keep it warm.

It is an object of the present invention is to provide a heat exchanger module for use in an internal combustion engine equipped with a fuel injection system, which (heat exchanger module) heats the fuel in the injection system to an optimum temperature for injection and keeps the fuel at this temperature level.

SUMMARY OF THE INVENTION

An essential aspect of the heat exchanger module according to the invention rests in the fact that the heat exchanger module features a distributor block, which is connected via at least one first fuel line with the intake of the injection system and via at least one second fuel line with the output of the injection system, wherein a thermal compensation takes place between the at least one fuel conveyed out of the injection system and the distributor block. The fuel leaving the injection system is added to the fuel supply of the injection system via the distributor block (short-circuit return flow). The distributor block through which the fuel flows is capable of keeping the temperature of the fuel supplied to the injection system within close tolerances, without requiring the return to the tank of vegetable oil already heated. The fuel is heated in this process while flowing through the injection system primarily due to the mechanical work during the generation of high pressures and the heat released from combustion. The distributor block takes thermal energy from the circulating fuel as needed, stores the energy and/or re-supplies it to the fuel.

BRIEF DESCRIPTION OF THE DRAWINGS

One exemplary embodiment of the invention is described below in more detail with reference to the FIGURE.

DETAILED DESCRIPTION OF THE INVENTION

Figure 1:
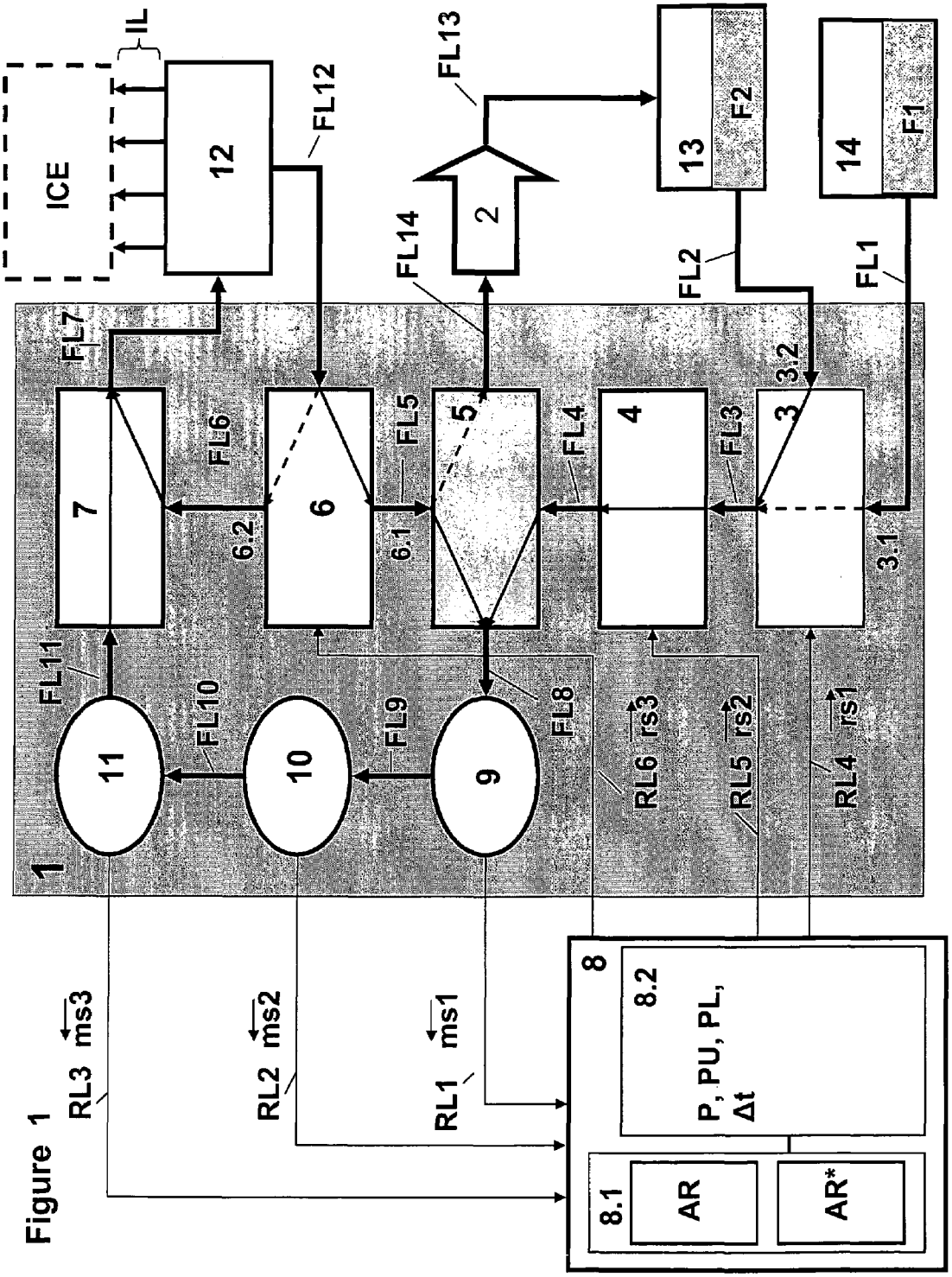
FIG. 1 shows by way of example in a schematic block diagram one exemplary embodiment of the distributor block 1 according to the invention.

The distributor block 1 is connected via several injection lines IL for example to an internal combustion engine ICE, into which at least one fuel type F1, F2 or one fuel mixture is injected. Furthermore, one first fuel tank 14 and one second fuel tank 13 are connected via one first and second fuel line FL1, FL2 to the distributor block 1. The first fuel tank 12 contains one first fuel type F1, in the present embodiment diesel fuel, and the second fuel tank 14 contains one second fuel type F2, for example vegetable oil. Furthermore, the distributor block 1 is connected via an excess pressure valve 2 with the second fuel tank 13 and via first through sixth regulating lines RL1 through RL6 to a regulating unit 8.

The distributor block 1 features by way of example a forward flow valve 3, a pre-supply pump 4, a fuel filter 5, a bypass valve 6, a T-element 7 and a pressure sensor 9, a volume flow meter 10 and a temperature sensor 11.

The first fuel tank 14 is connected via the first fuel line FL1 to a first intake 3.1 of the forward flow valve 3 and the second fuel tank 13 is connected via the second fuel line FL2 to a second intake 3.2 of the forward flow valve 3. Furthermore, the forward flow valve 3 leads via a third fuel line FL3 to the pre-supply pump 4, which is connected via a fourth fuel line FL4 to a fuel filter 5. The latter can be designed for example as a fuel filter cartridge screwed onto a filter flange, which is an element of the distributor block 1.

The fuel filter 5 is connected via an eighth fuel line FL8 with a pressure sensor 9, which in the present embodiment is implemented as a piezoresistive semiconductor sensor with absolute pressure measurement through a reference vacuum. The pressure sensor 9 is in turn connected via a ninth fuel line FL9 with the volume flow meter 10, which leads via a tenth fuel line FL10 to the temperature sensor 11. The temperature sensor 11 can be implemented for example as an NTC semiconductor in a preferred embodiment.

Furthermore, the pressure sensor 11 is connected via an eleventh fuel line FL11 with the T-element 7, which leads via a seventh fuel line FL7 to the injection system 12. For the return of the fuel mixture from the injection system 12 to the distributor block 1, the latter or the bypass valve located in the distributor block 1 is connected via a twelfth fuel line FL12 with the injection system 12.

In the depicted embodiment the forward flow valve and the bypass valve 3,6 are designed as 3/2 way valves, which preferably can be implemented as electrically activated solenoid valves. Furthermore, the bypass valve 6 features one first and second switch position 6.1, 6.2, which in the figure are indicated by a solid or dashed line, respectively. In the first switch position 6.1 the injection system 12 is connected via the twelfth fuel line FL12 with the bypass valve 6 and the latter via the fifth fuel line FL5 with an intake of the fuel filter 5. In the second switch position 6.2 the injection system 12 is connected via the twelfth fuel line FL12 with the bypass valve 6 and the latter via the sixth fuel line FL6 with the T-element 7, which in turn returns via the seventh fuel line FL7 to the injection system 12, thus completing the circuit.

The fuel filter 5 is connected via the fourteenth fuel line FL14 with the excess pressure valve 2, wherein the excess pressure valve 2 can be designed for example as a spring disk valve. The excess pressure valve 2 finally is connected via a thirteenth fuel line FL13 with the second fuel tank 13.

The units and fuel lines contained in the distributor block in the following exemplary embodiment are selected by way of example and can vary from application to application.

In a particularly preferred embodiment of the invention, such a distributor block 1 is manufactured from aluminum, wherein the drillings and millings within the distributor block 1 define the line routes and are used for mounting actuators and sensors. The distributor block 1 can for example be irrigated additionally with water through corresponding channels not depicted in the figure. For this purpose, preferably the cooling water from the internal combustion engine ICE can be used, which can be kept at a constant temperature in this way.

The regulating unit 8 is connected via a first regulating line RL1 with the pressure sensor 9, via a second regulating line RL2 with the volume flow meter 10 and via a third regulating line RL3 with the temperature sensor 11. Also connected to the regulating unit 8 are the forward flow valve 3 via a fourth regulating line RL4, the pre-supply pump 4 via a fifth regulating line RL5 and the bypass valve 6 via a sixth regulating line RL6.

The regulating unit 8 features a microprocessor unit 8.1 and a memory unit 8.2, wherein the microprocessor unit 8.1 is provided with an analysis routine AR, by means of which the forward and return flow valves 3, 6 implemented for example as electronic solenoid valves and the forward flow pump 4 can be switched based on first through third regulating signals rs1 through rs3 and, with the pressure sensor 9, the volume flow meter 10 and the temperature sensor 11, operating parameters can be transmitted via first through third measuring signals ms1 through ms3 to the regulating unit 8 and stored in the memory unit 8.2

In the following, with reference to the schematic block diagram depicted in the figure, the various operating modes of the internal combustion engine ICE with diesel fuel as the first fuel type F1 and vegetable oil as the second fuel type F2 are explained in more detail The function of the bypass valve 6 can be considered separately, since the bypass valve 6 is switched either to the first or second switch position 6.1, 6.2 dependent on the first through third measuring signals ms1 through ms3 measured by the pressure sensor 9, the volume meter 10 and the temperature sensor 11. For cooling of the fuel returning via the twelfth fuel line FL12 from the injection system 12, this fuel is fed by switching the bypass valve 6 into the first switch position 6.1 via the fuel filter 5, wherein it cools automatically and at the same time heats the fuel filter 5, causing it to be mixed with the contents of the latter.

In the second switch position 6.2 the fuel returning via the twelfth fuel line FL12 is again fed to the forward flow line or the seventh fuel line FL7, bypassing the fuel filter 5 via the T-element 7. This makes it possible to attain fuel temperatures in the injection system 12 that are higher than the current temperature of the distributor block 1. This can be used to advantage particularly if fast heating of the injection system 12 to operating temperature is necessary.

In operation with vegetable oil or diesel fuel without a return flow, the internal combustion engine ICE is supplied via the forward flow valve 3 optionally in a first switch position 3.1 with diesel fuel F2 or in a second switch position 3.2 with vegetable oil F1. The pre-supply pump 4 is connected via the forward flow valve 3—depending on the switched position—with the diesel tank 4 or the vegetable oil tank 13.

In the following, the operating principle for vegetable oil operation is described by way of example. The pre-supply pump 4 pumps vegetable oil F1 from the vegetable oil tank 13 via the second fuel line FL2, the forward flow valve 3, which is in the second switch position 3.2, the third and fourth fuel line FL3, FL4 into the fuel filter 5.

As long as the pressure P measured with the pressure sensor 9 and analyzed with the analysis routine AR is less than the opening pressure or the upper reference pressure PU of the excess pressure valve 2, the pressure P in the line system increases from the fourth and fourteenth fuel line FL4, FL14. If the pressure P determined by the analysis routine AR is equal to or greater than the opening pressure PU of the excess pressure valve 2, then the pre-supply pump 4 is switched off via a second regulating signal rs2 generated in the regulating unit 8, which (signal) is transmitted via the fifth regulating line RL5 to the pre-supply pump 4.

After switching off the pre-supply pump 4, the pressure P drops due to the fuel leaving the injection system 12 via the injection lines IL. If the pressure P measured by the pressure sensor 9 via the first regulating line RL1 decreases and has a value that is less than or equal to a lower reference pressure PL, then the pre-supply pump 4 is switched on again by means of the second regulating signal rs2 transmitted via the fifth regulating line RL5. Both the upper and the lower reference pressure PU, PL are stored in the memory unit 8.2 and are determined depending on the given system parameters. The described operating mode is now continued cyclically. A preset fuel mixture ratio can be set in this process, for example via cyclic switching of the forward flow valve 3 from the first to the second switch position 3.1, 3.2 and vice versa, corresponding to the switch ratio.

In a preferable operating mode, air or vapor separation can be implemented in the depicted device. For this purpose, the pressure P is raised one time above the upper reference pressure PU after completion of a cycle described above and therefore before switching off of the pre-supply pump 4, causing the excess pressure valve 2 to open. Based on the design, any air collected after the excess pressure valve 2 in the return line or the thirteenth fuel line FL13 is returned to the vegetable oil tank 13. After a preset short time □t the pre-supply pump 4 is again switched off and a new cycle with vegetable oil operation is started.

In addition, the analysis of the first measuring signal ms1 measured in the pressure sensor 9 and of the second measuring signal ms2 measured in the volume flow meter 10, taking into account the temperature 11 measured by the temperature sensor 11 ("third measuring signal ms3") based on a further analysis unit AR*, makes it possible to determine the viscosity of the fuel and/or the condition of the filter. For this purpose, the measured first through third measuring signals ms1 through ms3 are compared with the values stored in the memory unit 8.2 and the viscosity of the fuel and/or the filter condition is estimated based on the results of the comparison. For a known fuel mixture ratio, for example 100% diesel fuel, information can be provided on the condition of the filter. Furthermore, the viscosity of the fuel or of the fuel mixture can be determined for a known filter condition, for which the value was stored in the memory unit 8.2 for example at the time of a known fuel mixture ratio. For a known temperature, this is for its part a function of the fuel mixture ratio.

It is advantageous that the fuel leaving the distributor block 1 designed preferably as an aluminum block has the same temperature as that of the distributor block 1 in all described operating states in which the bypass valve 6 is in the first switch position 6.1 and the fuel is supplied via the fuel filter 5. This is accompanied by an exchange of heat between the distributor block 1 and the fuel and vice versa.

In the present embodiment the invention is described based on a first and second fuel tank 13, 14 and a forward flow valve 3 provided for switching purposes. However, a person skilled in the art recognizes immediately that this is not absolutely necessary and that one tank is fully sufficient for realization of the invention. A person skilled in the art also recognizes that it is possible to dispense with the flow rate sensor 10, without interfering with the fundamental principal of the invention.

Also the bypass valve 6 can be provided optionally for temperature regulation, wherein designs are conceivable in which the regulating unit can be dispensed with in that an overflow valve can be provided in place of the excess pressure valve.

The invention was described above based on one exemplary embodiment. It goes without saying that numerous modifications are possible without abandoning the underlying inventive idea on which the invention is based.

What is claimed is:

1. A heat exchanger module for use in an internal combustion engine containing a fuel injection system, comprising
   a distributor block made of a thermal conductive material,
   the distributor block connected via at least one first fuel line with the intake of the injection system and via at least one second fuel line with the output of the injection system,
   wherein at least one first fuel type is supplied to the fuel injection system via the distributor block and the first fuel line for operation of the internal combustion engine,
   the distributor block having a bypass valve connected to the second fuel line for recycling fuel leaving the injection system via the distributor block,
   wherein said fuel is conducted depending on a switch position of the bypass valve via a first route or a second route of different lengths via the distributor block,
   whereby a thermal compensation takes place between the at least one fuel recycled from the injection system and the distributor block controlled via the switch position of the bypass valve,
   wherein the distributor block comprises a forward flow valve for the selectable supply of a first or second fuel.

2. The heat exchanger module according to claim 1, wherein
   for heating of the distributor block, said block is additionally connected to the cooling water circuit of the internal combustion engine.

3. The heat exchanger module according to claim 1, wherein
   the distributor block comprises a pre-supply pump.

4. The heat exchanger module according to claim 1, wherein
   the distributor block comprises a fuel filter, wherein via said fuel filter at least a partial thermal compensation takes place between the at least one fuel conveyed out of the injection system and the distributor block.

5. The heat exchanger module according to claim 1, wherein
   the distributor block comprises a mechanism for the separation of air, the mechanism is an excess pressure valve.

6. The heat exchanger module according to claim 1, wherein
   the distributor block features a pressure sensor, a volume meter device and/or a temperature sensor, which are connected respectively via regulating lines with a regulating unit.

7. A heat exchanger module for use in an internal combustion engine containing a fuel injection system, comprising
- a distributor block made of a thermal conductive material,
- the distributor block connected via at least one first fuel line with the intake of the injection system and via at least one second fuel line with the output of the injection system,
- wherein at least one first fuel type is supplied to the fuel injection system via the distributor block and the first fuel line for operation of the internal combustion engine,
- the distributor block having a bypass valve connected to the second fuel line for recycling fuel leaving the injection system via the distributor block,
- wherein said fuel is conducted depending on a switch position of the bypass valve via a first route or a second route of different lengths via the distributor block,
- whereby a thermal compensation takes place between the at least one fuel recycled from the injection system and the distributor block controlled via the switch position of the bypass valve, the distributor block comprises a supplementary electric heater for heating the distributor block, and
- wherein, when supplying first and second fuels of differing temperatures to the distributor block, the difference in their temperatures is equalized.

8. A heat exchanger module according to claim 7,
the distributor block comprises a bypass valve.

* * * * *